United States Patent Office 3,542,574
Patented Nov. 24, 1970

3,542,574
ORGANOSILICON OVEN RELEASE
COMPOSITIONS
George R. Payne, Kernersville, N.C., assignor to Dow
Corning Corporation, Midland, Mich., a corporation
of Michigan
No Drawing. Filed Apr. 22, 1968, Ser. No. 723,315
Int. Cl. C08h 17/50
U.S. Cl. 106—287                                    5 Claims

ABSTRACT OF THE DISCLOSURE

Compositions particularly suitable for release of food from the interior of ovens consisting of a mixture of (1) a copolymer of a trifluoropropylmethylsiloxane and an aminoalkylsiloxane, (2) a dimethylpolysiloxane fluid and (3) a phenylmethylpolysiloxane fluid. An example of such a composition is a mixture of a copolymer of (1) $NH_2CH_2CH_2CH_2SiO_{3/2}$, $Me_2SiO$ and $CF_3CH_2CH_2\overset{\underset{\displaystyle Me}{|}}{Si}O$ (2) a 1,000 cs. dimethylpolysiloxane fluid and (3) a 500 cs. phenylmethylsiloxane fluid.

---

One of the more disagreeable chores for a housewife is the cleaning of an oven wherein the food has become charred on the surface of the oven. There have been several solutions suggested for this problem, one invloves the use of strong cleaning materials generally containing alkaline agents which will remove the grease and charred food. However, this involves considerable work, especially when cleaning the top and back of the oven. Other solutions involve coating the interior of the oven with a material from which the food will release. This invention relates to the latter process. Among the suggested materials have been phenyl-containing organosilicon resins such as those disclosed in U.S. Pats. 3,308,079 and 3,308,080. Whereas, these materials release quite well, they suffer from the disadvantage that the food stains the resinous coating and this stain is not removed when the burned food is removed. Furthermore, the resinous coating continues to harden with use until eventually it is necessary to remove it from the interior of the oven. This involves an excessive amount of labor and is generally not desirable.

Other attempts to solve this problem has been to coat the interior of the oven with a dimethylsiloxane fluid thickened with a silica. Whereas this coating is easy to remove from the oven it is not a particularly satisfactory food release agent.

It is the object of this invention to provide a coating for the interior of an oven which does not stain excessively in contact with food and which can be easily removed from the surface of the oven. This enables the housewife to employ the instant compositions and when they no longer operate to remove them by wiping with a cloth and thereafter apply a fresh coating to the oven interior.

This invention relates to a composition of matter consisting essentially of a mixture of (a) from 4 to 25% by weight of a copolymer of
    (1) from 0.6 to 12.8 mol percent siloxane units of the formula $$R'_2NR''\overset{\underset{\displaystyle R'''_n}{|}}{Si}O_{\frac{3-n}{2}}$$

in which
R' is hydrogen, an aliphatic hydrocarbon radical or an aminoalkyl radical, R'' is a divalent hydrocarbon radical of at least 3 carbon atoms in which the Si is at least three carbon atoms removed from the N,
n is 0 or 1, and
R''' is a hydrocarbon radical, or amine-acid salts of said siloxane units,
(2) from 2.4 to 98.7 mol percent trifluoropropylmethylsiloxane and
(3) from 0 to 97 mol percent

in which R is phenyl or methyl,
(b) from 59 to 92% by weight of a dimethylpolysiloxane fluid having a viscosity of from 100 to 60,000 cs. and
(c) from 4 to 16% by weight of a phenylmethylpolysiloxane fluid of from 100 to 60,000 cs. viscosity.

The composition of this invention are prepared by mixing (a), (b) and (c) in any convenient manner. In general, they are employed in the form of a solvent solution and can be applied to the oven or other surface with a dauber or other wiping mechanism, or they can be sprayed on the surface from an aerosol formulation. In the latter, the compositions are diluted with standard propellants such as chloro-fluoro-ethanes and methanes.

Composition (a) is a copolymer of trifluoropropylmethylsiloxane and the aminoalkylsiloxanes; or it can be a terpolymer of dimethylsiloxane and/or phenylmethylsiloxane, trifluoropropylmethylsiloxane and the aminoalkylsiloxane defined above. These copolymers are best prepared by mixing the corresponding hydroxyl-endblocked diorganosiloxane with an alkoxyaminoalkylsilane of the formula

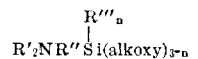

When the ingredients are so mixed reaction takes place spontaneously to form a copolymer of the aminoalkoxysilane and the hydroxyl-endblocked diorganosiloxanes (2) and (3). The byproduct is an alkanol. The amine group in (1) acts as a catalyst for the reaction of Si alkoxy with SiOH and for the condensation of two SiOH groups.

The reaction can be carried out at room-temperature although it is often advantageous to reflux the mixture of the ingredients in a suitable solvent such as toluene or perchloroethylene in order to hasten the reaction and to carry it to completion. It is evident when reaction has been accomplished because the composition forms a homogeneous mixture whereas if reaction is incomplete a two-phase product is obtained.

Examples of

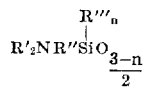

units (1) which are operative herein include those in which R' is any aliphatic hydrocarbon radical, preferable of from 1 to 6 carbon atoms, such as methyl, ethyl, allyl, hexenyl, hexyl and octadecyl and any aminoalkyl radical such as $H_2NCH_2CH_2$—, $H_2N(CH_2)_3$—, $H_2N(CH_2)_6$—, $MeNHCH_2CH_2$—

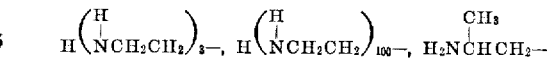

and $$H_2N\overset{\underset{\displaystyle C_2H_5}{|}}{C}HCH_3—$$

R''' is any monovalent hydrocarbon radical such as alkyl radicals such as methyl, ethyl or octadecyl; alkenyl radicals such as vinyl, allyl and hexenyl; cycloaliphatic hydrocarbon radicals such as cyclohexyl, cyclohexenyl, cyclopentyl and methyl cyclohexyl; aryl hydrocarbon radicals such as phenyl, tolyl, naphthyl, xenyl and xylyl and aralkyl radicals such as benzyl, β-phenylethyl and β-phenylpropyl.

R″ is any divalent aliphatic hydrocarbon radical of at least 3 carbon atoms such as

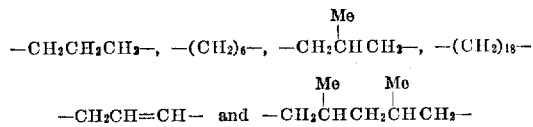

It is preferably that R″ and R‴ contain no more than 6 carbon atoms each.

(1) can also be in the form of an amine-acid salt. That is the amino groups can be protonated with an acid to form the salt. The anion can be of any acid such as organic acids such as carboxylic acids such as acetic, formic, propionic, benzoic, etc.; sulfonic acids such as benzene sulfonic; phosphonic acids such as ethylphosphonic acid or dibutyl phosphinic acid; and acid sulfates such as ethylhydrogen sulfate and inorganic acids such as hydrochloric, sulfuric, nitric, phosphoric or phosphinic. There can be one or more protonated amine groups per siloxane unit (1) (for example,

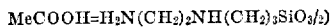

or

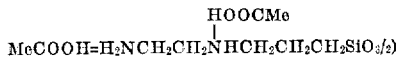

The dimethylpolysiloxane (b) can be either a single fluid or a mixture of two or more fluids of various viscosities. These materials are standard articles of commerce.

Phenylmethylpolysiloxane fluid (c) can also be a single material or a mixture of fluids of two or more viscosities. In case of (b) and (c) the fluids are endblocked with suitable triorganosiloxane-endblocking materials such as trimethylsiloxane, phenyldimethylsiloxane or diphenylmethylsiloxane; or other triorganosiloxy-endblocking materials commonly employed in the siloxane fluid art.

The proportion of the ingredients shown above is critical for the purpose of obtaining satisfactory release or non-staining properties of the composition.

When the compositions of this invention are applied to the interior of an oven one obtains resistance to staining from charred food which comes in contact with the coating and excellent food release as shown by the fact that food will release repeatedly from the same spot without recoating with the composition. This means that the food can be easily wiped from the oven. Furthermore, the coating can be easily removed by soap and water from the oven surface prior to recoating. All of these factors make the composition of this invention an excellent material for use by the housewife.

It should be understood that the compositions of this invention can be applied to any surface such as metal, organic plastic, wood, natural fibers, siliceous surfaces such as glass, porcelain or ceramic and inorganic surfaces in general, and the surface can be part of any article such as cooking utensils in general, as well as other implements for the purpose of releasing food or other organic or inorganic matter from the surface.

The standard test employed hereinafter to check the operativeness of the compositions of this invention for food release was carried out by spraying the composition onto poreclain panels such as the porcelainized steel employed in ovens, in amount to give 3 mg. of coating per square inch of panel. The coating was allowed to air dry for one hour and then was baked one hour at 400° F. Cherry pie filling was applied to the panel and then burned by heating one hour at 400° F. The ease of removal of the charred filling from the coated surface was then observed. Staining of the coating was observed visually. By staining is meant the stain remaining on the coating, or in the coating, after removal of the charred food. The coatings were also evaluated for ease of removal of the coating by soap and water.

The following examples are illustrative only and should not be construed as limiting the invention which is properly delineated in the appended claims. Me is used herein to designate the methyl radical.

EXAMPLE 1

All parts shown herein are parts by weight. The following copolymers were prepared:

(a)

3.7 parts by weight of $(MeO)_3Si(CH_2)_3NH_2$,
30 parts of a hydroxyl-endblocked dimethylpolysiloxane of about 35 cs. viscosity and
15.8 parts by weight of a hydroxyl-endblocked trifluoropropylmethylpolysiloxane having about 2.5% by weight silicon-bonded hydroxyl were mixed in 47 parts 1,1,1-trichloroethane solvent and
2.8 parts by weight acetic acid was added.

Reaction was carried out at room-temperature to give a copolymer of the acetate salt of aminopropylsiloxane, dimethylsiloxane and trifluoropropylmethylsiloxane, i.e.

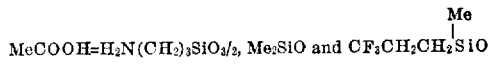

(b)

3.7 parts of $(MeO)_3Si(CH_2)_3NH_2$,
30 parts of a hydroxyl-endblocked dimethylpolysiloxane of 70 cs. viscosity,
15 parts of a hydroxyl-endblocked trifluoropropylmethylsiloxane having 3% by weight hydroxyl,
47.7 parts of 1,1,1-trichloroethane and
2.8 parts of acetic acid were mixed and allowed to react at room-temperature.

(c)

3.7 parts of $(MeO)_3Si(CH_2)_3NH_2$,
30 parts of a hydroxyl-endblocked phenylmethylpolysiloxane having about 4% by weight silicon-bonded hydroxyl groups
15 parts of a hydroxyl-endblocked trifluoropropylmethylpolysiloxane having about 5% by weight silicon-bonded hydroxyl groups,
47 parts 1,1,1-trichloroethane and
2.8 parts acetic acid were mixed and allowed to react to form a copolymer.

(d)

3.7 parts of $(MeO)_3Si(CH_2)_3NH_2$ were mixed with
45.8 parts of a hydroxyl-endblocked trifluoropropylmethylsiloxane having 3% by weight silicon-bonded hydroxyl,
47.7 parts 1,1,1-trichloroethane and
2.8 parts of acetic acid to form a copolymer at room temperature.

Each of the copolymer solutions (a), (b), (c) and (d) in the amount of 2.666 parts were mixed with 2.68 parts of a 60,000 cs. trimethylsiloxy-endblocked dimethylsiloxane fluid, 10.68 parts of a 1,000 cs. trimethylsiloxy-endblocked dimethylsiloxane fluid, 1.32 parts of a trimethylsiloxy-endblocked phenylmethylpolysiloxane fluid of 500 cs. viscosity and 82.66 parts of 1,1,1-trichloroethane.

Each of the above formulations were made into an aerosol spray by mixing 25 parts of each mixture with 45 parts of trichlorofluoromethane and 30 parts of difluorodichloromethane. Each formulation was loaded into an aerosol can and each was sprayed onto porcelain panels, allowed to air dry for one hour, then baked one hour at 400° F. Each formulation showed excellent release and little staining when checked in the standard cherry pie filling tests shown above.

EXAMPLE 2

Each of the following aminesilanes were mixed in amount of 3.7 parts with 30 parts of a hydroxyl-endblocked phenylmethylpolysiloxane having about 5% silicon-bonded hydroxyl groups, 15.8 parts of a hydroxyl-endblocked trifluoropropylmethylsiloxane having about 2% by weight silicon-bonded hydroxyl groups, 47.7 parts of 1,1,1-trichloroethane and 2.8 parts of acetic acid and allowed to stand at room-temperature to form the corresponding copolymer of the acetate salt of the aminesiloxane, phenylmethylsiloxane, and trifluoropropylmethylsiloxane.

The amines were:

(a) $H_2NCH_2CH_2NHCH_2\overset{Me}{\underset{|}{C}}H\overset{Me}{\underset{|}{C}}H_2Si(OMe)_3$ (b) $H_2NCH_2CH_2NH(CH_2)_3Si(OMe)_3$ (c) $H_2NCH_2CH_2NHCH_2\overset{Me}{\underset{|}{C}}HCH_2Si(OMe)_3$ 2.66 parts of each of the above solutions were mixed with 1.32 parts of a trimethylsiloxy-endblocked phenylmethylpolysiloxane of 500 cs. viscosity, 10.68 parts of a trimethylsiloxy-endblocked dimethylsiloxane fluid of 1,000 cs. viscosity, 2.68 parts of a 60,000 cs. trimethylsiloxy-endblocked dimethylsiloxane and 79.75 parts 1,1,1-trichloroethane.

25 parts of each formulation was mixed with 45 parts of fluorotrichloromethane and 30 parts of difluorodichloromethane. The formulations were sprayed on the porcelain panels and tested as in Example 1 and in all cases excellent release and little staining was obtained.

A better procedure for the preparation of the copolymers of (a), (b) and (c) is to reflux the solution of the silanes, the phenylmethylsiloxane fluid and the trifluoropropylmethylsiloxane fluid for about one hour.

EXAMPLE 3

30 parts by weight of a hydroxyl-endblocked phenylmethylpolysiloxane fluid having 4% by weight silicon-bonded hydroxyls, 15.8 parts of a hydroxyl-endblocked trifluoropropylmethylsiloxane having 4% by weight silicon-bonded hydroxyl, 3.7 parts of $(MeO)_3Si(CH_2)_3NMe_2$ were mixed with 47.7 parts 1,1,1-trichloroethane and 2.8 parts of acetic acid. The mixture was allowed to stand at room temperature to form the corresponding copolymer.

5.32 parts of the above solution was mixed with 1.32 parts of a 500 cs. trimethylsiloxy-endblocked phenylmethylpolysiloxane, 10.68 parts of a 1000 cs. trimethylsiloxy-endblocked dimethylpolysiloxane, 2.68 parts of a trimethylsiloxy-endblocked dimethylpolysiloxane fluid of 60,000 cs. viscosity and 80 parts of 1,1,1-trichloroethane. This formulation was made into an aerosol formulation corresponding to that of Example 1, and sprayed onto porcelain panels and checked in the manner of Example 1. Equivalent results were obtained.

EXAMPLE 4

3.7 parts of $(MeO)_3Si(CH_2)_3NHMe$, 30 parts of a hydroxyl-endblocked phenylmethylpolysiloxane fluid having 4% by weight silicon-bonded hydroxyl groups, 15.8 parts of hydroxyl-endblocked trifluoropropylmethylsiloxane having 3% by weight silicon-bonded hydroxyl groups, 20 parts of 1,1,1-trichloroethane, 27.7 parts of isopropanol and 2.8 parts of acetic acid were mixed and allowed to stand at room-temperature to form the copolymer.

4 parts of the above solution was mixed with one part of a trimethylsiloxy-endblocked phenylmethylpolysiloxane having 500 cs. viscosity, 1 part of a trimethylsiloxy-endblocked dimethylpolysiloxane of 60,000 cs., 9 parts of a trimethylsiloxy-endblocked dimethylsiloxane of 100 cs. and 86 parts of 1,1,1-trichloroethane.

This formulation was made into the standard aerosol formultion of Example 1, sprayed on porcelain panels and checked in the manner of Example 1. Excellent release and non-staining properties was obtained.

EXAMPLE 5

Equivalent results were obtained when the acetic acid is left out of any of the above formulations.

That which is claimed is:
1. A composition of matter consisting essentially of a mixture of
   (a) from 4 to 25% by weight of a copolymer of
       (1) from 0.6 to 12.8 mol percent silozane units of the formula $$R'_2NR''SiO_{\frac{3-n}{2}}^{R'''_n}$$

in which
   R' is hydrogen, an aliphatic hydrocarbon radical of 1 to 6 carbon atoms or an aminoalykl radical of 1 to 6 carbon atoms,
   R" is a divalent hydrocarbon radical of 3 to 6, in which the N is at least 3 carbon atoms removed from the Si,
   n is 0 or 1, and
   R''' is a monovalent hydrocarbon radical of 1 to 6 carbon atoms, or amine salts of said siloxane units and monocarboxylic acids of 1 to 7 carbon atoms, benzene sulfonic acid, ethylphosphonic acid, dibutyl phosphinic acid, acid ethyl hydrogen sulfate, hydrochloric acid, sulfuric acid, nitric acid, phosphoric acid or phosphinic acid,
       (2) from 2.4 to 98.7 mol percent 3,3,3-trifluoropropyl-methylsiloxane units and
       (3) from 0 to 97 mol percent $$\overset{CH_3}{\underset{|}{R}}SiO$$

units in which R is phenyl or methyl,
   (b) from 59 to 92 percent by weight of a dimethylpolysiloxane fluid having a viscosity of from 100 to 60,000 cs. at 25° C., and
   (c) from 4 to 16 percent by weight of a phenylmethylpolysiloxane fluid having a viscosity of from 100 to 60,000 cs. at 25° C., all percents by weight being based on the total weight of (a), (b) and (c).
2. A method of obtaining food release from a surface comprising applying to the surface a composition of claim 1 and thereafter allowing the composition to dry.
3. The method of claim 2 where the surface is on the inside of an oven.
4. A composition of claim 1 in which R', R" and R''' each contain no more than 6 carbon atoms.
5. A composition of claim 4 in which n is 0.

References Cited

UNITED STATES PATENTS

| 3,308,080 | 3/1967 | Haennt | 260—29.1 |
| 3,419,514 | 12/1968 | Hadlock | 260—825 XR |

JULIUS FROME, Primary Examiner

L. B. HAYES, Assistant Examiner

U.S. Cl. X.R.

117—123, 124, 135.1